April 27, 1937.     F. H. GULLIKSEN     2,078,661
INDICATING AND REGULATING SYSTEM Filed Dec. 12, 1933     3 Sheets-Sheet 1

Fig. 1.

INVENTOR
*Finn H. Gulliksen.*
BY
ATTORNEY

April 27, 1937.  F. H. GULLIKSEN  2,078,661
INDICATING AND REGULATING SYSTEM
Filed Dec. 12, 1933  3 Sheets-Sheet 2

WITNESSES:  Fig. 2.  INVENTOR
  Finn H. Gulliksen.
  BY
  ATTORNEY

April 27, 1937.    F. H. GULLIKSEN    2,078,661
INDICATING AND REGULATING SYSTEM
Filed Dec. 12, 1933    3 Sheets-Sheet 3

INVENTOR
*Finn H. Gulliksen.*
BY 
ATTORNEY

Patented Apr. 27, 1937

2,078,661

UNITED STATES PATENT OFFICE 2,078,661

INDICATING AND REGULATING SYSTEM

Finn H. Gulliksen, Wilkinsburg, Pa., assignor to Westinghouse Electric & Manufacturing Company, East Pittsburgh, Pa., a corporation of Pennsylvania Application December 12, 1933, Serial No. 702,090

1 Claim. (Cl. 177—351)

My invention pertains to thickness indicators and regulators, and more particularly to a system for continuously indicating and regulating the thickness of a moving web of sheet material such as paper or rubber during the process of manufacture.

The efficient production of a web of sheet material of high quality and uniformity requires that the thickness of the manufactured web be continuously regulated very accurately to specification. Otherwise, the manufacturer must make the thicker portions of the web overweight in order that the thinner portions will not be under the listed specification thereby bringing the accusation of short weight. The additional weight that must be put on the web for this purpose is just so much waste material, and it can be readily seen that with an expensive material such as rubber the value of the wasted material may be very great. It has been estimated for example, that one thousandth of an inch over size on the rubber calender rolls of one well known rubber manufacturer represents a loss of about one-fourth of a million dollars worth of material per year. Furthermore, with some materials the lack of uniformity is also a serious objection.

Previously, it has been customary to cut samples from the continuous web of material, at intervals, for weighing and calipering. This method is objectionable because it is impossible to thereby obtain continuous indications, and since it takes considerable time to complete an observation the thickness may vary considerably and a great length of the web will be ruined before the discrepancy is detected. Furthermore, the continuous web of material is marred by this method and much material is wasted.

Although the great demand for a device which would continuously and accurately indicate and regulate the thickness of such a web has been recognized for some time, to my best knowledge and belief a device commercially suitable and satisfactory for this purpose has never before been provided. Apparatus previously intended for this purpose has been unsatisfactory for various reasons such as insufficient accuracy and reliability, or because they were influenced by other factors than that which they were supposed to indicate or regulate, and other difficulties which were encountered in actual commercial practice.

It is accordingly an object of my invention to provide a thickness indicator and regulator which will be accurate and commercially satisfactory for continuously regulating and indicating the thickness of a continuous moving web.

Another object of my invention is to provide a web thickness indicator and regulator which operates from a balanced or zero condition and which automatically restores itself to a balanced condition after each operation whereby changing tube characteristics or factors other than the thickness of the web will have no effect upon the accuracy of the system.

A further object of my invention is to provide a system of the character described having such a high degree of accuracy that manufacturers will be enabled to eliminate the large amount of waste usually tolerated to assure full specified dimensions.

In accordance with my invention, I provide two reactors connected in a Wheatstone bridge circuit. The paper runs between the core and the armature of one reactor, and varying paper thickness consequently changes the air gap of this reactor and therefore changes the reactor impedance. The air gap of the other reactor, the balancing reactor, is controlled by means of a split series motor. When the air gaps of the two reactors are equal, the Wheatstone bridge is balanced, the voltage across two push pull amplifier stages is zero, and the relay controlling the split series motor is in vibrating condition. If, however, due to a change in paper thickness, the air gap of one reactor is changed, the Wheatstone bridge becomes unbalanced, and due to the action of the push pull amplifier the air gap adjusting motor will operate until the air gaps of the two reactors again are equal.

The pen movement of a recording meter is geared directly to the shaft of the air gap adjusting motor, thus giving an indication of the paper thickness. Contacts are arranged on both sides of the pen of the recording meter and disposed to energize relays which will operate the motor operated stock gate valve if the paper thickness gets outside predescribed limits. In order to prevent hunting, time delay relays of the electronic type are connected in the control circuit so that the time of each operation is limited, and after any adjustment the relays will not operate during a time interval corresponding to the time required for the paper with readjusted thickness to reach the indicating reactor.

Except for the paper actuated reactor and the controlled valve motor or other device, the entire apparatus is mounted in a compact steel cabinet. For giving clear indications of the operating condition of the system various distinctly colored lamp signals are mounted in conspicuous positions on the cabinet.

The invention itself, however, both as to its organization and its method of operation, together with additional objects and advantages thereof, will best be understood from the following description of specific embodiments, when read in conjunction with the accompanying drawings, in which:

Figure 1:
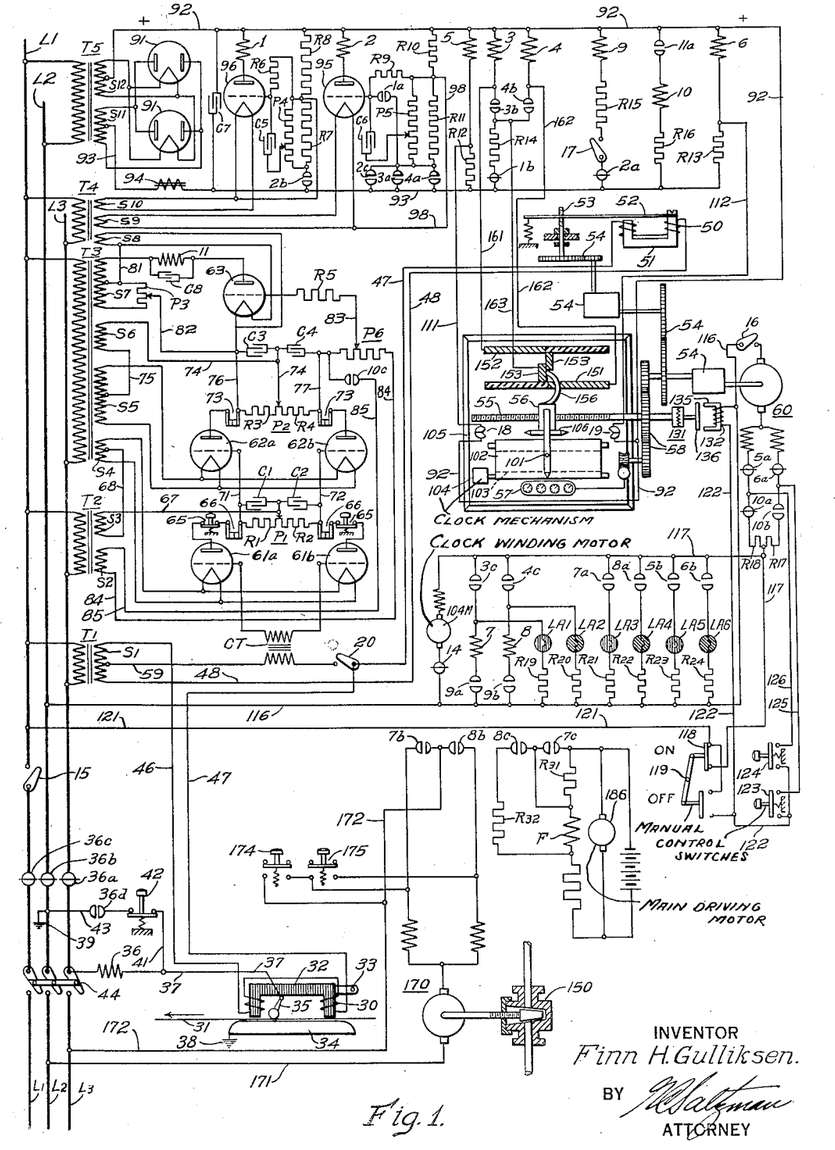
Figure 1 is a diagrammatic view representing an indicating and regulating system arranged in accordance with my invention.

Referring more specifically to Fig. 1 of the drawings, my system is entirely energized from any ordinary three-phase alternating current line such as that represented by the main conductors L1, L2 and L3 in which the phase sequence is in the same order. The thickness responsive portion of the system which is directly responsive to the thickness of a continuous moving web comprises an exploring coil 30, the reactance of which is varied in accordance with the thickness of the continuously moving web 31 to be observed. For this purpose the coil is supported on an open, or U-shaped, core structure 32 which is secured by a pivotal support 33 adjacent a plate 34 of magnetizable material over which the web 31 of paper, or other material, passes in the process of manufacture. This plate 34 of magnetizable material may also be a roller or some other part of a paper or rubber manufacturing or processing machine, and it functions as an armature member for the core structure 32. Since the air gap between it and the core 32 is determined in accordance with the thickness of the web 31, the reluctance of the magnetic circuit and hence the reactance of the coil 30 is varied accordingly.

The core structure of the coil also pivotally supports an electrical contactor 35 which is normally held in spaced insulated relation from the metallic plate 34 by the web of material. If the web breaks, the contactor 35 by engaging the plate 34 completes an electrical circuit from one of the main line conductors L3 through the winding of relay 36 of an electromagnetic switch which then opens its contacts 36a, 36b and 36c in the main line circuit thereby completely de-energizing the recording and regulating system.

The energizing circuit for the coil 36 of this main line switch may be traced from main line conductor L3 through the winding of relay 36, by a conductor 37 to the pivoted contactor 35, to the armature member 34, thence by ground 38 to main line conductor L2 which is grounded at 39. The main line electromagnetic switch 36 is also provided with front contactors 36d for completing a stick circuit through the winding of relay 36 by way of a conductor 41 through a normally closed push button resetting switch 42, contactor 36d and a conductor 43 to the main line conductor L2. In most installations a manually actuable switch 44 is also connected into the main line conductors L1, L2 and L3 for completely disconnecting the entire system at any time.

In order that the variations of reactance, caused by the varying thickness of the web may be effectively utilized for recording and regulating, the web controlled coil 30 is connected by suitable conductors 46, 47 and 48 in series relation with a second reactance coil 50, and a source of alternating current such as the center-tapped secondary winding S1 of a suitable transformer T1. The second reactance coil 50 is also supported on an open U-shaped core 51 having an associated armature member 52 which is mounted for movement to vary the air gap and hence the reactance of the coil through a predetermined range. This is readily accomplished by providing a thin flexible strip of magnetizable material secured rigidly to one leg of the open U-shaped core 51 and extending beyond the end of the other leg of the core structure. The end of a threaded shaft 53 projects through the extended end of the armature member 52, and by rotating the shaft the armature member may be moved toward or away from the open end of the core 51 to thereby vary the reactance of the coil 50.

The rotation of the armature adjusting shaft 53 is controlled by a split series motor 60, to which it is connected by suitable speed reducing gears 54. The motor is also connected through gears 58 to rotate a screw shaft 55 and drive a recording pen carriage 56 and a counter indicating mechanism 57 which gives direct indications of the thickness of the associated air gap in ten thousandths of an inch or any other desired unit. The motor 60 is reversibly controlled, in a manner to be subsequently set forth.

It will be apparent that when the reactance of the two coils 30 and 50 is equal in the series circuit, the alternating-current voltage drop will be equal across the two coils. Therefore, under this condition the conductor 47 intermediate the two reactance coils, and the center tap connection 59 on the transformer T1 secondary winding S1, are equi-potential points. Conversely if variations of web thickness cause the reactance of said first coil 30 to vary, the alternating-current voltage will no longer be equally divided across the two coils 30 and 50, the system will be unbalanced, and a corresponding voltage difference will occur between the conductor 47 and 59, normally equi-potential points. If the web becomes thinner, for example, the reactance of the associated coil 30 will become greater and the unbalanced or difference voltage appearing across the normally equi-potential points will have a predetermined phase relation relative to voltage on the main line conductors L1 and L3. However, if the unbalancing of the coil reactances is caused by the web thickness increasing instead of decreasing, it will be apparent that the phase relation of this difference voltage to the main alternating-current voltage will be reversed.

In the operation of my system, the magnitude and phase relation of the unbalanced alternating-current voltage on this reactance bridge circuit is the manifestation of the variations of web thickness which I utilize to control a recorder or other indicator and any desired regulating members. To accomplish this control with the necessary degree of accuracy, sensitivity, and reliability, I impress the unbalanced bridge voltages upon the input circuit of a special amplifier of the so-called direct-current type which is entirely energized by alternating-current.

The amplifier comprising two pairs of tubes 61a, 61b, 62a and 62b connected in push-pull fashion, and an output tube 63, which in turn controls a relay 11 for actuating the system. The two tubes 61a and 61b comprising the first stage of the amplifier are preferably of the type sold on the open market as DRJ—548. The grids of the first stage tubes are coupled to the reactance bridge circuit preferably by means of a suitable coupling transformer CT having its primary winding connected across the normally equi-potential points of the circuit between conductors 47 and 59, and its secondary terminals connected directly to the grids.

The plates of the first pair of tubes are respectively connected, through circuits each comprising a normally closed push-button switch 65 and a plug-in jack 66, to opposite ends of the resistance element of a potentiometer P1. To energize the plates, a conductor 67 extends from the sliding contactor of the potentiometer P1 to one end of a secondary winding S3 on a transformer T2. The filaments of the first stage tubes are connected in parallel relation to a secondary winding S4 on a separate transformer T3. This filament heating winding S4 has a center tap which is connected by a suitable conductor 68 to the unconnected end of the plate energizing winding S3 on the other transformer T2 to complete the plate circuit. The portions of the potentiometer resistance element which are connected into the plate circuits of the tubes 61a and 61b of the first stage of the amplifier are respectively designated R1 and R2. The portions R1 and R2 of the potentiometer resistor are respectively by-passed by suitable condensers C1 and C2 connected in shunt relation thereto between the sliding contactor and the respective ends of the resistor to smooth out the ripples in the plate current.

The first stage of the amplifier is coupled to the second stage by conductors 71 and 72 connected directly between the terminals of the potentiometer P1 in the plate circuit of the first stage, and the respective grids of the tubes 62a and 62b of the second stage. The plates of the tubes of the second stage are respectively connected through plug-in jacks 73 to opposite ends of the resistance element of a potentiometer P2. To energize the second stage plates, a conductor 74 is extended from the sliding contactor of the potentiometer P2 to one end of a separate secondary winding S6 on the transformer T3.

The filaments of the second stage tubes are connected in parallel relation to a separate secondary winding S5 on the transformer T3 from which they are supplied with heating current. A center tap on the filament heating winding S5 is connected directly by a conductor 75 to the unconnected end of the plate energizing winding S6 to complete the plate circuit. The portions R3 and R4 of the potentiometer resistor included in the respective plate circuits of the second stage tubes are by-passed by suitable condensers C3 and C4 connected in shunt therewith by direct connection between the conductor 74 secured to the sliding contactor and conductors 76 and 77 connected to the respective terminals of the resistor element.

In the first and second stages of the amplifier there is no connection from the grid circuit to the filament. This greatly improves the sensitivity of the amplifier. Such connection usually includes a resistor which will shunt a portion of the input voltage, and its omission increases the amount of input voltage impressed on the amplifying circuit. Assuming that, at a given instant, the cathodes of a pair of tubes are negative, and the grids of the two tubes are of opposite polarity, the resistance of one of the tubes, between cathode and grid, will be higher than the other so that the available input voltage is impressed almost entirely on one tube.

The plate circuit of the output tube extends from the plate through a relay 11 to be controlled, thence to one end of a separate center-tapped secondary winding S7 on the transformer T3, from which it is energized. A conductor 81 is connected directly from the center tap of said plate energizing winding S7 to one end of a low voltage secondary winding S8 on a separate transformer T4, which is connected to heat the filament of the tube.

It will thus be apparent that only a portion of the secondary winding S7 energizes the plate of the output tube, the remaining portion of this winding being utilized to provide suitable alternating-current grid-biasing potentials. For this purpose, the other portion of this winding S7 is shunted by the resistance element of a potentiometer P3 which is connected between the center tap and the unconnected end of the winding. The slidable contactor of the potentiometer P3 is connected by a suitable conductor 82 to conductor 76, thence to one end of the resistor portion R3 of the potentiometer P2 in the plate circuit of one of the second stage tubes 62a. The other end of this potentiometer resistor is connected by conductor 77 to the end of the resistor element of another potentiometer P6 which is connected to the grid of the output tube through a suitable conductor 83 and high resistance resistor R5.

The resistor of the potentiometer P6 is connected through conductors 84 and 85 to a separate secondary winding S2 on the transformer T2 by way of relay contactor 10C when the corresponding relay winding 10 is energized. This applies a negative bias to the grid of the output tube 63 to prevent hunting. By adjusting the sliding contactor on the potentiometer P6 the sensitivity of the amplifier may be varied.

The complete grid circuit of the output tube 63 may be traced from the filament heating circuit by way of the conductor 81 to the center tap on the plate energizing winding, thence through the potentiometer P3 and its slidable contactor, through the conductor 82 to one terminal of the second stage plate potentiometer resistor P2 to another potentiometer P6, thence from the slidable contactor by way of a conductor 83 and a resistor R5 to the grid.

The relay 11 in the plate circuit of the output tube is not responsive to the 60-cycle variations in the plate current and its winding is by-passed by a suitable condenser C8. The primary windings of the transformers T1, T2, T3 and T4 are all connected directly across the main line conductors L1 and L3 for energization therefrom.

Figure 3:
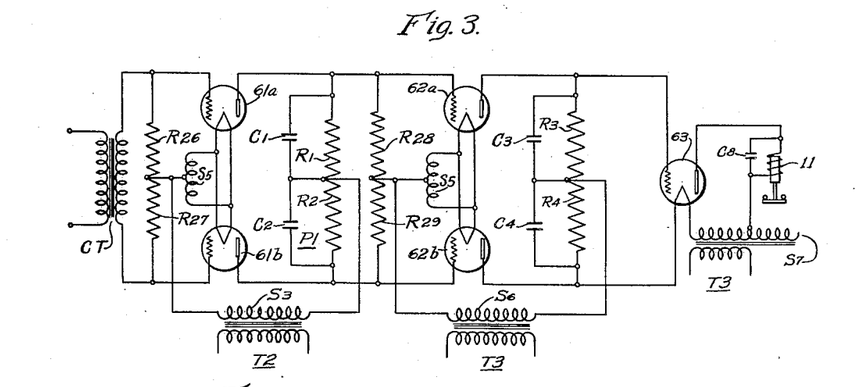
Fig. 3 is a simplified diagram showing a modification of the amplifier circuits.

Under certain conditions it may be desirable to diminish the extreme sensitivity of the amplifier to provide for more stable operation. This may be desirable when the atmospheric humidity is so high that the condensing moisture causes varying grid leakage or when the tubes are not in good condition. I have shown in Fig. 3 how the amplifier circuit may be modified to accomplish this by providing a matched pair of resistors R26 and R27 between the grids and the center tapped filament winding S5 of the first stage, and a similar pair of resistors R28 and R29 in the second stage of the amplifier. Although the diagram shown in Fig. 3 is equivalent to the fundamental circuit of Fig. 1, except as above indicated, its arrangement has been simplified by omitting various structural details. The amplifier circuit is adjusted so that the tubes operate along the straight portions of their characteristic and operate at about the middle of the straight portion.

To provide a reliable source of direct current for energizing various relays, a pair of full-wave rectifier tubes 91 are provided. The filaments are preferably connected in parallel relation for energization from a suitable low voltage secondary winding S12 on a separate transformer T5 which has its primary winding energized from the main line conductors L1 and L2 to which it is directly connected. One plate of each rectifier tube is connected to one end of a high voltage winding S11 on the transformer, and the other plate of each tube is connected to the other end of the winding. The positive conductor 92 of the direct-current supply extends from a center tap on the filament winding S12 to the various relays to be energized therefrom and the negative return conductor 93 is connected to a center tap on the high voltage plate winding. By providing a suitable choke coil 94 in series and a large capacity condenser C7 in shunt with the rectifiers, the ripples may be filtered out of the rectifier current in a well-known manner.

The windings of various relays 1, 2, 3, 4, 5, 6, 9 and 10 are connected to the positive direct-current conductor 92 for the energization therefrom to actuate various contactors and control the operation of the system. The other terminal of each of these relay windings is connected to the negative direct current conductor 93 through some controlling device. Relays 3, 4, 5, 6, 9 and 10 also have suitable current limiting resistors R11, R12, R13, R14, R15 and R16 in series with the connection to the negative side of the direct current line to protect their windings from the full voltage when connected directly across. The contacts associated with each relay winding are for convenience designated on the drawings by the same reference numeral as the corresponding winding followed by letters such as a, b or c.

Figure 2:
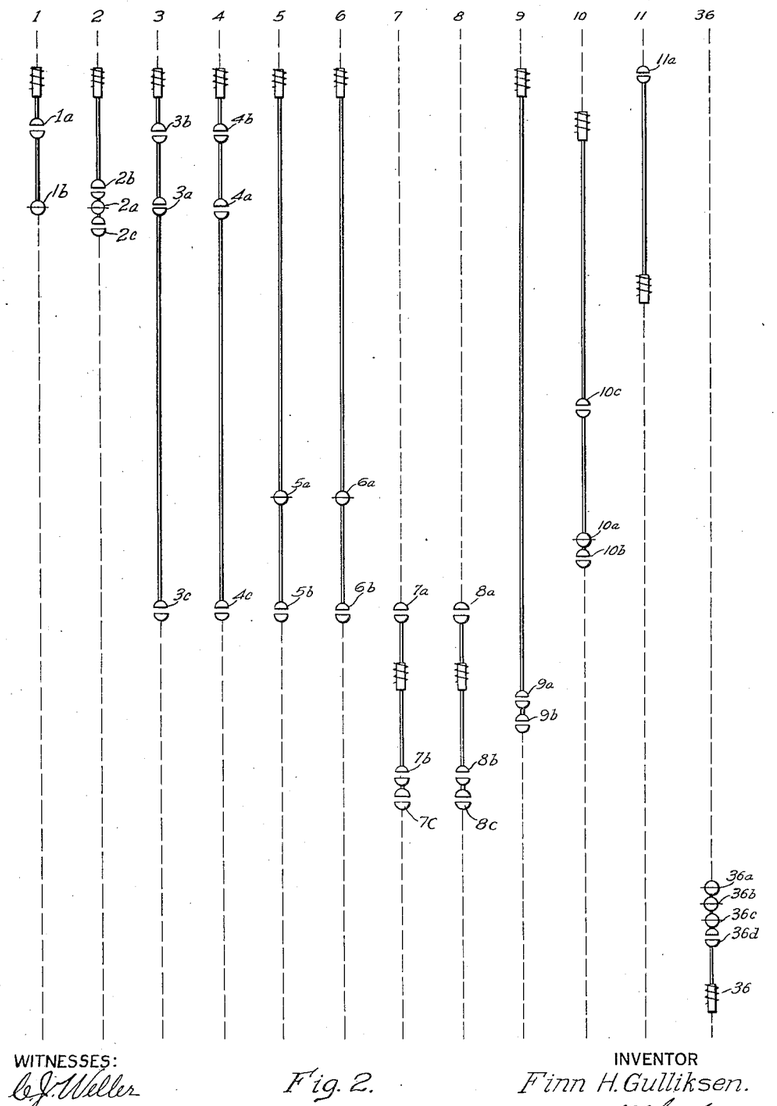
Fig. 2 is a diagrammatic view showing the relative vertical positions of the relay coils and their associated contacts for convenience in reading the wiring diagram of Fig. 1.

In Fig. 2 of the drawings, each relay winding is shown in associated relation with its armature and contactors in their unenergized positions. The vertical positions of these elements in Fig. 2 also correspond to their vertical positions in Fig. 1, and the tracing of the circuits will be greatly facilitated by disposing these figures in side-by-side relation.

The operation of the relay 2 is controlled by a gaseous discharge device 95 to limit the time during which any given regulating operation of the system may continue. The relay 1 is controlled by another gaseous discharge device 96 to prevent the repeated operation of the regulating system until the effect of the first regulation has had time to reach the web controlled variable reactance coil, thereby preventing hunting back and forth due to over-regulation.

The discharge tube 95, which controls the time interval of an operation, has its filament connected directly to a separate secondary winding S9 on the transformer T4 and its plate is connected to the positive direct-current conductor 92 through the winding of the relay 2 to be controlled. The grid circuit of tube 95 extends from the grid through a suitable high resistor R9 to one of the filament conductors 98. From the filament conductor 98 a resistor R10 is also connected to the positive direct-current supply conductor 92. Also extending from the filament conductor 98, a resistor R11 and a potentiometer P5 are connected in parallel relation to one side of these different sets of relay contacts 2c, 3a and 4a, any of which when closed complete the connection to the negative direct-current conductor 93. A contactor 1a associated with the relay 1 is connected between the grid of the tube to the remote end of the resistor of the potentiometer P5. A grid biasing condenser C6 is connected between the grid of the tube 95 and the slidable contactor of the potentiometer P5 to provide an adjustable charging time for the condenser, thereby predetermining the time interval which must pass between the energization of the tube 95 and the time when its plate will pass sufficient current to energize the relay winding 2 and cause it to pull up its armature and close its contactors. By adjusting the potentiometer P5, a time delay up to one minute may be introduced between the instant of closure of contactors 3a or 4a and the actuation of relay 2.

When this time interval has elapsed, and relay 2 operates, its contactors 2b energize the circuits associated with relay 1 and its control tube. This tube is provided with a grid biasing condenser C5, an adjustable potentiometer P4, and resistors R6, R7 and R8, which cooperate therewith in a manner similar to that previously described with reference to the corresponding elements associated with the other time controlling discharge tube 95. There is a difference, however, since there is no relay contactor connected directly to the grid of this tube, and the only contactor which can energize the circuits of this tube is the contactor 2b controlled by the relay 2.

The time delay here introduced may be adjusted up to about five minutes in order to allow the effect of the regulation to reach the variable reactance coil 30 actuated by the web before another operation can be started. When this interval of time has elapsed, relay 1 is energized and pulls up thereby closing its contacts 1a associated with the grid and biasing condenser C6 of the other tube which is thereby discharged, thus removing the positive grid bias and deenergizing the winding of the relay 2 in the plate circuit of said tube. This in turn causes the associated contacts 2b to open, thereby deenergizing the circuits associated with the other relay 1 which now opens its contacts 1a associated with the opposite tube. The timing relays and tubes are now restored to their original condition and are ready for the next actuation by the relay 3 or 4 which will cause the above sequence of operations to be repeated.

Although the electronically controlled timing relays 1 and 2 control the time duration of each regulating operation and ensure a sufficient interval between regulating operations, they do not initiate the operation of the recording device which is controlled directly by the thickness of the web. The operations of the regulating device are controlled in turn by the movements of the pen carriage on the recorder.

As previously set forth, the recorder comprises a threaded shaft 55 on which the pen carriage 56 is mounted for movement to the right or left. A pen 101 on the carriage is thereby moved over a record sheet 102 comprising a roll of suitable graph paper to trace a record of the thickness variations of the web. The graph paper 102 is drawn under the pen 101 at a constant speed over a roller 103 driven by a clock mechanism 104, or any constant speed device in the manner common in recorders. The clock 104 may be driven by a spring mechanism which is rewound by an electric motor 104M controlled by contacts 14 closed by the spring as it unwinds in a well known manner. Normally closed pairs of limit contactors 18 and 19 are mounted on opposite sides of a panel 105 which supports the recorder. The contactors are disposed in alignment with a member 106 of insulating material carried by the pen carriage 56 and provided with sharp edges adapted to separate either pair of contactors 18 or 19 and interrupt either of the associated circuits when the carriage has been moved to its extreme position in either direction to thereby stop the motor 60 and prevent the apparatus being damaged by continued operation.

It will be seen that one contactor of each pair 18 and 19 is connected directly to the positive direct-current conductor 92. The other contact of one pair of the limit contacts 18 is connected by a conductor 111 to the lower terminal of the winding of relay 5, and the free contact of the other pair of limit contacts 19 is connected by a conductor 112 to a lower terminal of the other limit relay winding 6. Each of these relays is provided with a pair of back contacts 5a and 6a which are respectively connected in series with the two reversing circuits of the series split field recorder motor, whereby the motor will be disabled only in the direction it is running when either pair of the limit contactors 18 or 19 is actuated by the extreme movement of the pen carriage. In normal operation, both pairs of limit contactors 18 and 19 are closed, hence the windings of both of the relays 5 and 6 are normally shunted and thereby deenergized and the back contacts 5a and 6a are normally closed.

Figures 4, 5, 6:
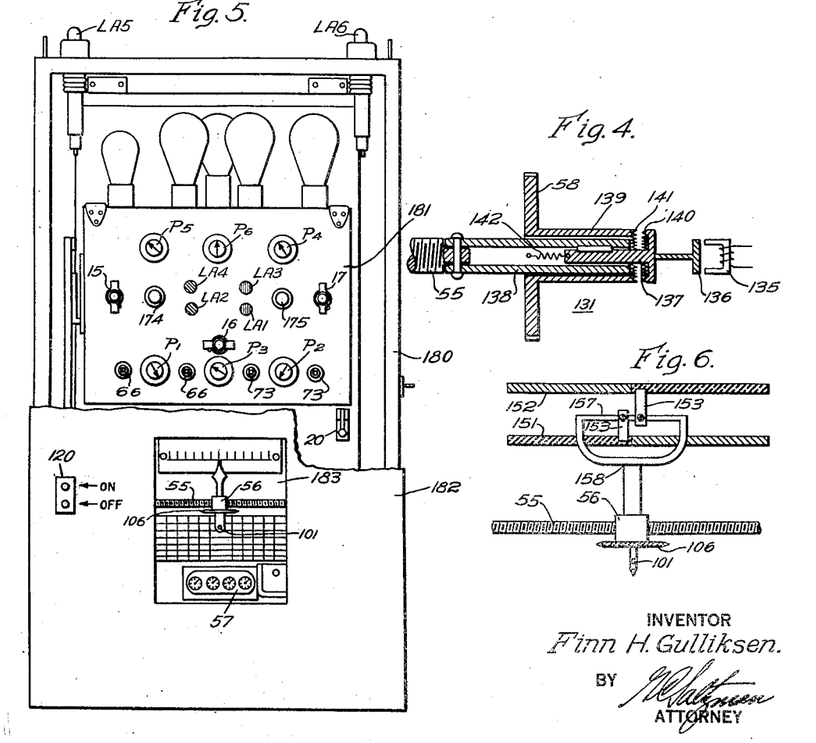
Fig. 4 is a detail sectional view showing the magnetic clutch used for controlling the connection of the indicator motor with the recorder pen carriage.
Fig. 5 is a front elevational view of the cabinet with a portion of the door broken away to illustrate the apparatus assembled within.
Fig. 6 is a detail view showing the adjustable support for the regulating brushes.

The recorder motor control circuit may be traced from the main line conductor L2 by way of a suitable conductor 116 to the manual switch 16 adjacent the motor 60, thence through the motor armature and through one or the other of the series field windings to operate the motor in one direction or the other. From either field winding, the circuit may be traced through limit relay contactors 5a or 6a (both of which are normally closed), thence by way of whichever pair of relay contactors 10a or 10b happens to be closed. When the associated relay winding 10 is energized, the contactors 10b are closed, but when the winding 10 is not energized the contactors 10a are closed. From the pair of contactors 10a or 10b, the circuit continues through resistor R18 or R17, thence by way of a conductor 117 through the contacts 118 of a manual switch 119 in its "on" position and by way of a conductor 121 to the other main line conductor L. During normal automatic operation, the manual switch 119 remains in its "on" position, being conveniently controlled by push buttons 120 (Fig. 5).

The direction of operation of the recorder motor 60 depends upon the state of energization of the energizing circuit of which the relay coil 10, the energizing circuit of which may be traced directly from the positive direct-current conductor 92 through the contacts 11a of relay 11, the coil 10, and current limiting resistor R16 to the negative direct-current conductor 93. The completion of this circuit depends only upon the closure of the contacts 11a which are controlled by the relay coil 11 in the plate circuit of the last amplifier tube 63. Therefore the magnitude of the current in the plate circuit of the output tube 63 determines the position of relay contactors 10a and 10b, and the running direction of the recorder motor at any instant.

Manual control of the recorder motor 60 is desirable for adjusting the air gap of the associated reactor coil 50, and this is accomplished by manually actuating the manual switch 119 to the "off" position, thereby transferring the control connections from the conductor 121 to a conductor 122 from which the motor circuit may be completed by either one of a pair of push buttons 123 or 124 through either one of a pair of conductors 125 or 126 through the limit relay contacts 5a or 6a and either one of the field windings of the motor.

The depression of one of the push buttons 123 or 124 will then cause the recorder motor to run in one direction, and the other push button will cause it to run in the opposite direction. But in either case, it is necessary that the operation of the motor should not move the pen carriage 56 as otherwise an adjustment of the air gap relative to the recorder would not be accomplished. For disconnecting the recorder from the motor driven gear train 58, an electromagnetic clutch 131 is provided and its winding 132 is connected between the conductor 116 which is permanently connected to the main line conductor L2, and the conductor 122 which was connected to the other main line conductor L1 through the associated conductor 121 by the movement of the manual switch 119 to the "off" position.

Hence, the movement of the manual switch 119 to "off" position immediately interrupts the mechanical connection between the recorder motor 60 and the screw shaft 55 of the recorder. The subsequent operation of either push button 123 or 124 associated with this motor will then run the motor in one direction or the other and will adjust the air gap of the associated reactor coil 50 without moving the recorder pen and indicator.

The electromagnetic clutch 131 may be of any well known construction or similar to that shown in Fig. 4. As shown, the electromagnet 135 may be disposed adjacent a disk like armature member 136 secured to a plunger 137 which extends slidably into a sleeve 138 which is rigidly secured to the end of the threaded recorder shaft 55. The sleeve 138 extends loosely through an orifice in the hub 139 of one of the gear wheels 58 which is loosely journalled thereon. The slidable plunger 137 and the aperture in the sleeve 138 in which it is slidably received are preferably of square cross-section to prevent relative rotation therebetween, although this may be accomplished by a loosely interfitting key, pin or other suitable arrangement. The outer portion of the plunger carries a laterally projecting friction engaging surface 140 which is disposed in cooperatve relation to suitable cooperative friction engaging surface 141 provided on the outer edge of the gear hub 139. A biasing spring 142 in the sleeve aperture normally holds the friction surfaces in interlocking relation whereby the driving torque is transmitted from the loosely journalled gear wheel 58 through the plunger 137 and the sleeve 138 to the threaded recorder shaft 55. However, when the clutch electromagnet 135 is energized, the plunger 137 is pulled outwardly and the mechanical driving connection to the recorder is interrupted.

To automatically correct for the thickness variations of the web 31, a regulating member 150, such as a gate or valve for controlling the supply of raw material, is actuated in accordance with the movements of the recorder pen carriage. For this purpose a pair of elongated contact bars 151 and 152 are secured upon the upper portion of the recorder panel 105 in any suitable manner. Brushes 153 are mounted in slidable engagement with the contact bars and are connected with the pen carriage 56 by a suitable connecting member 156, whereby the brushes are caused to slide along the contact bars in accordance with the movements of the pen carriage.

Approximately half of each contact bar 151 and 152 is provided with an insulating surface or made entirely of insulation, as indicated by the hatched portions. The insulated portions of the contact bars are disposed in opposite directions, and the slidable brushes 153 are so disposed adjacent thereto that in the mid-position the brushes rest upon the insulating surface or portion on both bars. Hence, a slight movement of the brushes by the pen carriage will bring one or the other of the brushes into electrically conductive engagement with one or the other of the contact bars depending upon which direction the pen carriage is moved. This depends upon whether the web has become thicker or thinner than the standard dimension.

The tolerated amount of movement of the pen carriage 56 from the zero position to start the regulating operation may be adjusted, and for this purpose the brushes 153 are slidably supported on a guide rail 157 to which they are secured by set screws, as shown in Fig. 6. The guide rail 157 is mounted upon a Y-shaped bracket 158 supported on the pen carriage 56. By moving the pen carriage 56 to its zero position, and releasing the set screws, the brushes 153 may be adjusted to the desired lateral positions relative to the conducting portions of the contact bars 151 and 152.

The regulating step to be initiated by the movement of the brush is controlled through the regulating relays 3 and 4. One end of each relay winding 3 and 4 is connected directly to the positive direct-current conductor 92. The negative end of the relay coil 3 is connected by a suitable conductor 161 to the conductive portion of the upper contact bar 152, and the negative end of the other relay coil 4 is connected by a conductor 162 to the lower contact bar 151. A conductor 163 also extends from the slidable brush 153 through a current limiting resistor R14 and back contacts 1b, of the timing relay 1, to the negative direct-current conductor 93.

It will be apparent that the engagement of the sliding brush 153 with the conductive area of either contact bar 152 or 151 will complete an energizing circuit through the corresponding regulating relay 3 or 4. In order that either regulating relay may lock itself in, a pair of front contacts 3b or 4b associated with each respective relay winding 3 or 4 is connected directly from the negative end of the corresponding winding to the resistor R14, hence in shunt relation to the pen carriage controlled contacts.

The regulating relays 3 and 4 are also provided with corresponding pairs of front contacts 3c and 4c which complete energizing circuits through relays 7 and 8 to run a valve motor 170 in one direction or the other in accordance with the regulation desired.

The circuits for energizing the relays 7 and 8 may be traced from the main relay conductor L1 by way of the conductor 121 extending through the manual switch 119, when in its "on" position, thence through the conductor 117 to the contacts 3c and 4c. By the closure of either of these relay contactors, the circuit is completed through the corresponding relay coil 7 or 8, the normally closed contacts 9a and 9b, thence by way of the conductor 116 to the other main line conductor L2. The contactors 9a and 9b are front contacts on the relay 9 and are closed as long as its coil remains energized through a circuit extending from the positive direct-current conductor 92, through coil 9, resistor R15, manual switch 17 and back contacts 2a of timing relay 2. When in the course of operation of the timing relay 2 its coil is energized and its contacts 2a open, the coil of relay 9 is deenergized and its contacts 9a and 9b open, thereby terminating any regulating operation then under way.

The valve motor circuits completed by relays 7 and 8 may be traced from the main line conductor L2 by way of a conductor 171 through the motor armature, thence through either portion of its split series field windings by way of either pair of relay contactors 7b or 8b depending upon the direction of motor rotation required for the regulation to be automatically effected. From the relay contactors 7b and 8b an interconnected conductor 172 extends to the other main line conductor L3.

Thus the motor 170 is operated to either open or close the valve 150 which may regulate the flow of paper stock, or other material, to automatically correct for any variations of the web thickness. It is to be understood, however, that the motor controlled by the relays may be or may actuate any other regulating member in accordance with the manufacturing process to which my invention is applied.

The relays 7 and 8 may also be provided with additional contactors 7c and 8c for simultaneously regulating the speed of a motor 186 which drives the main machine, by respectively shunting out a series resistor R31 in the field circuit or closing a circuit to shunt a resistor R32 around the field winding F.

Manual control of the valve motor 170 may be accomplished at any time desired by depressing either one of a pair of push buttons 174 or 175 to complete the motor circuit from either one of the split series fields by way of the return conductor 172 to the main line conductor L3 even while the relay contactors 7b and 8b are open.

The thickness recorder and regulator is preferably mounted in a steel cabinet 186 as shown in Fig. 5. The cabinet is quite compact being only about 33 inches high, 19 inches wide, and 16 inches deep. The cabinet is arranged with removable back, and should be mounted so that the rear is accessible. The various parts of the regulator are mounted in the rear and the front of a 16" x 28" ebony asbestos panel 181. In the rear of the panel are mounted transformers, resistors, and condensers, while the adjusting potentiometers and control switches are mounted on front of the panel which hangs on hinges secured to its upper edge. The steel cabinet is equipped with a hinged door 182, which is arranged with a glass window 183 so that the recording meter chart, the indicator, may be easily seen without opening the door. An additional window in the upper half of the door (not shown) is provided to render visible the signal lights LA1 through 4.

In order that the attendant may be promptly and continuously informed of the condition of the system, three pairs of pilot lamps are provided to indicate whether or not the regulator is working properly. Two pairs of pilot lamps LA1, LA2, LA3 and LA4 are mounted inside the steel cabinet, and one pair of pilot lamps LA5 and LA6 is mounted on the front of the cabinet. One pair of the inside pilot lamps LA1 and LA2 will indicate when the control contacts of the pen carriage engage, while the other pair of the inside pilot lamps LA3 and LA4 indicates when the stock valve motor is operating. The pilot lamps LA5 and LA6 mounted on the cabinet are energized by the limit switches of the open carriage and will light up if the paper thickness is 5/10000 inch away from the normal thickness.

In order that the energization of these pilot lamps may be properly controlled to provide the desired indications, the red pilot lamp LA1 is energized by a circuit connected between the relay winding 7 and extending through the lamp and a suitable current limiting resistor R19 to the conductor 116 which extends to main line conductor L2 whereby it is connected in shunt around the relay winding 7 and series contactors 9a. The green pilot lamp LA2 is connected in shunt around the relay winding 8 and the series contactors 9b, through a suitable resistor R20. Hence, the energization of either of the limit relays 3 or 4 closing their contactors 3c or 4c will immediately cause one of the pilot lamps LA1 or LA2 to light up irrespective of whether the relay 9 is energized or not.

The other red pilot lamps LA3 and LA5 and the green pilot lamps LA4 and LA6 are connected on one side directly through suitable current limiting resistors R21, R23, R22 and R24, respectively, to the conductor 116 extending from the main line L2. The other terminals of the lamps LA3 and LA4 are connected to the conductor 117 through contactors 7a and 8a, either of which are closed when coils 7 or 8 are energized. The other terminals of lamps LA5 and LA6 are energized from the conductor 117 through pairs of contactors 5b and 6b which close when relay coils 5 or 6 are energized.

Before putting my recorder-regulating system into operation, it is necessary to calibrate the system for zero which is accomplished as follows:

Depress the "off" button of the push button panel 120 on front of the cabinet door. Actuate switch 17 to its open position. Open switch 20 on the right hand front side of the regulator base panel; actuate the alternating current switch 15 on the regulator control board and close the line switch 44. Insert, by means of telephone jacks a 150 volt voltmeter across the first stage jacks 66 and adjust the first stage potentiometer P1 so that the voltmeter reads zero. If zero reading cannot be obtained, interchange the first stage DRJ—548 tubes. If still zero reading cannot be obtained reverse the alternating current supply leads L1 and L3. Move the voltmeter to the second stage jacks 73 and adjust potentiometer P2 until zero volts is obtained. If a zero reading cannot be obtained interchange the second stage tubes which are the left hand front and rear DRJ—546 tubes in the cabinet. Turn potentiometer P6 all the way counter-clockwise, and always leave this potentiometer in this position. Adjust potentiometer P3 until relays 11 and 10 just operate.

To obtain the proper indicator calibration, operate the "off" one of the buttons on the push button panel 120 on the front of the cabinet door, thus operating the switch 119 to "off" and releasing the clutch. Place a sheet of paper of known thickness between the armature member 34 and the reactor core 32. Operate the indicator 57 by means of the push buttons 123 and 124 on the front door until the indicator shows the desired thickness, and then close switch 20.

The regulating zone is next adjusted by turning the pen movement screw shaft 55 by hand until the pen 101 is in the zero position. The brushes 153 are then adjusted laterally by releasing their respective set screws and sliding the brushes along the guide bar 157. The recording device is arranged so that one ten-thousandth inch paper thickness corresponds to one-half inch travel of the pin, hence very close regulating and indication is possible.

The total thickness of the paper is indicated by means of the indicator 57 geared to the air gap adjusting motor. It should be noted that the recording meter does not indicate the total thickness of the paper, but indicates the deviations in paper thickness from the normal thickness. The brush 153 and the two contact bars 151 and 152 associated with the carriage of the recording device are so arranged that the insensitivity zone of the regulator may be adjusted to any value within ± 3/10000 inch.

Operation of the complete system may be considered, assuming that it has been properly adjusted. As set forth, the web of material 31 passes continuously under the exploring coil 30 and causes its reactance to vary in accordance with the thickness of the web. While the thickness of the web is constant the reactance of the two reactor coils 30 and 50 balances and there is no input potential applied to the amplifier. The voltage drop caused by the plate current in the resistor R1 is then exactly equal and of opposite potential to that in the other resistor R2, whence the potential applied across the grids of the tubes of the second stage is also zero. In like manner, the potential across the resistors R3 and R4 in the plate circuits of the second stage is also zero and the plate current from the output tube is of the value corresponding to the zero adjustment set forth above. Under this condition the relays 11 and also 10 are just barely operated.

But since the web thickness is never exactly constant, there will always be minute variations, either increasing or decreasing, and corresponding input potentials will be impressed upon the amplifier. As previously set forth, these potentials will vary in phase relation relative to the main line depending upon whether the web thickness becomes greater or less than the standard, and the magnitude of these potentials will vary in accordance with the degree of thickness variation. The potentials of opposite phase relation have opposite effects upon the plate current of the output tube. This will be apparent if it is assumed that an alternating-current voltage is applied which is of such a phase relation as to cause the grid of one of the tubes 61a of the first stage to become positive and the grid of the other tube 61b to become negative at the instant when the plates of both of these tubes is positive. This will increase the current through the plate resistor R1 while decreasing it in resistor R2. The voltage drops in these resistors will no longer balance, but will be greater across resistor R1 than resistor R2. The unbalanced voltage is impressed across the grids of the tubes of the second stage of the amplifier, thereby causing the one to become more positive while the other is made negative causing a still greater variation in the plate currents of the second stage, resistors R3 and R4.

The unbalanced voltage drop across the plate resistors R3 and R4 of the second stage is much greater than it was in the first stage, and it is impressed upon the grid and filament of the output tube 63 where it applies a positive potential to the grid and causes a large variation in its plate current thereby controlling the associated relay 11 accordingly.

However, the application of an alternating-current voltage of the opposite phase relation to the input of the amplifier will make the grids of the tubes on the opposite side of the amplifier positive at the instant when the plates are positive. The plate current will now be increased in resistors R2 and R4 and decreased in resistors R1 and R3 with the result that the grid of the output tube 63 is made negative thereby decreasing its plate current and releasing the relay 11.

In normal operation, the relay 11 is caused to pull up and to release in fairly rapid succession by the minute variations in web thickness. The result is that relay 10 also tends to pull up and release in rapid succession to start the recorder motor 60 in first one direction or the other, with the actual result that the motor does not get started in either direction. When an actual definite change of web thickness occurs, however, the recorder motor continues to run in one direction and it thereby adjusts the air gap of the associated reactor coil 50 until it corresponds to the air gap of the coil 30 actuated by the web, thereby rebalancing the bridge circuit and reducing the amplifier input voltage to zero. When this occurs the motor 60 stops. The motor operation necessary to rebalance the reactance bridge also turns the screw shaft 55 thereby moving the pen carriage 56 of the recorder to trace the thickness variation on the paper chart. The indicator mechanism 57 is also actuated to indicate the new web thickness.

Regulation of the manufacturing process to correct the web thickness to the standard value is simultaneously set up as soon as the pen carriage moves the brush 153 sufficiently to one side or the other to establish conductive engagement with one or the other of the contact strips. As previously set forth, the regulating operation is started through the energization of a regulating relay 3 or 4 which also starts the electronic timing relays 1 and 2. As the latter operate at proper timed intervals, they control, by their contactors 1b and 2a, the time interval during which the thickness regulating device may operate and also prevent the repetition of a regulating operation until sufficient time has elapsed for the web affected by the completed operation to reach the exploring reactor coil 30.

Although I have shown and described certain specific embodiments of my invention, I am fully aware that many modifications thereof are possible. My invention, therefore, is not to be restricted except insofar as is necessitated by the prior art and by the spirit of the appended claim.

I claim as my invention:

The combination of a regulating member to control the thickness of a moving web, a motor for actuating said member, means responsive to the thickness of the web for controlling the energization of said motor, running time limiting means for limiting the period of time the motor may run during each actuation, and stop time limiting means for assuring that the motor will remain stationary for a predetermined time after an operation until the resulting regulation will have time to be effective at said thickness responsive means.

FINN H. GULLIKSEN.